Patented Feb. 2, 1932

1,843,376

UNITED STATES PATENT OFFICE

RICHARD STÜSSER, OF COLOGNE-DEUTZ, GERMANY, ASSIGNOR TO GENERAL ANILINE WORKS, INC., OF NEW YORK, N. Y., A CORPORATION OF DELAWARE

PROCESS FOR PREPARING CHROMIUM COMPOUNDS OF AZO-DYESTUFFS

No Drawing. Application filed April 16, 1930, Serial No 444,872, and in Germany April 19, 1929.

This invention relates to the manufacture of chromium compounds of azo dyestuffs forming metallic compounds, which dyestuffs contain groups inducing solubility, e. g. sulfonic, carboxylic or sulfamide groups or the like.

In the patent literature various processes are described for the manufacture of chromium compounds of such azo dyestuffs as are capable of forming metallic compounds, the azo dyestuffs capable of being chromed are characterized by containing in o-position to the azo group a hydroxy or carboxylic acid group or by containing in the molecule a hydroxy and carboxylic acid group in o-position to each other, the respective chroming processes operating in acid, neutral or even caustic alkaline solution. Obviously not all processes are suitable for the manufacture of a given chromium dyestuff, but for each individual dyestuff or each individual class of dyestuffs the appropriate method of procedure must be selected, since in many cases the desired chromium compound can only be obtained with difficulty or not at all by other processes. Thus, for example, the clear green chromium compound of the dyestuff from 5-nitro-2-amino-phenol and 2-naphthylamino-6-sulfonic acid has hitherto only been obtained in acid solution; while in alkaline solution only a dull blackish olive is produced.

The process in accordance with the present invention is capable of more general application and consists in carrying out the manufacture of the chromium compounds in the presence of an organic base, such as dimethylamine, aniline, hexahydromethylaniline, pyridine and the like. When proceeding according to this process chromium compounds are obtained, which according to the known process could only be produced in acid solution and also such chromium compounds as have hitherto been produced most satisfactorily in alkaline solution. Moreover, such chromium compounds as have not yet been obtainable by the process hitherto known and consequently are not hitherto known (such as for example, the chromium compounds of the azo dyestuffs from anthranilic acid with pyrazolone derivatives) can now be produced by the new process. The manufacture of the chromium compounds can be carried out by boiling under a reflux condenser or also in an autoclave under pressure the dyestuffs in the presence of a suitable chromium compound, such as chromium chloride or chromium fluoride. The bases can be used either as such or also diluted with water or with other solvents or diluents not taking part in the reaction, for example ethyl alcohol, the most preferred method of carrying out the process is by working in a 10–20% aqueous pyridine solution.

In many cases the manufacture of the dyestuffs and the chroming can be carried out in a single operation, since the organic bases, particularly the tertiary bases, favorably influence the coupling in the production of many dyestuffs.

The invention is illustrated by the following examples, without being limited thereto:

*Example 1.*—25 parts by weight of the azo dyestuff obtained from diazotized 4-sulfo-2-amino benzoic acid and 3-methyl-5-pyrazolone are heated in an autoclave during 6 hours at 120° C. together with 17 parts by weight of a 50 per cent solution of chromium chloride, 50 parts by weight of pyridine and 500 parts by weight of water. The mixture is rendered alkaline with sodium carbonate, the pyridine is removed with steam, the residue is filtered, and the chromium compound is separated by concentration of the liquid, salting out, filtering and drying. It is a brownish powder, soluble in water with a yellow coloration and dyeing wool yellow shades.

*Example 2.*—40 parts by weight of the azo dyestuff from diazotized 4 chloro-2-aminophenol-6-sulfonic acid and 3-methyl-1-phenyl-5-pyrazolone are heated for about 10 hours at 125° C. in an autoclave with 20 parts by weight of 50% chromium chloride solution, 50 parts by weight of pyridine and 300 parts by weight of water until the shade undergoes no further change. The solution is then filtered from unused chromium hydroxide, and the chromium compound of the dyestuff is obtained by salting out. It is a brown powder, which dissolves in water with a red coloration. The chromium compound of the dyestuff dyes wool red from an acid bath. The capacity for even dyeing is satisfactory. The dyeing is fast to fulling and light.

*Example 3.*—According to the process of Example 2 the chromium compound of the dyestuff from diazotized 4-chloro-2-aminophenol-6-sulfonic acid and 1.3-dihydroxyquinoline is obtained as a brownish red powder, which dyes wool evenly Bordeaux red shades, fast to fulling and light.

*Example 4.*—30 grams of the dyestuff from diazotized 5-nitro-2-aminophenol and 2-naphthylamine-6-sulfonic acid are boiled under a reflux condenser in 300 ccm of pyridine with 20 grams of 50% chromium chloride solution until the red color of the solution is changed to a clear green. The pyridine is then distilled off with steam, the solution is filtered from excess chromium hydroxide, and the chromium compound of the dyestuff is salted out; when necessary, the dyestuff is purified by redissolving. The dry chromium compound is a black powder, which in acid solution dyes wool green shades, fast to fulling and light.

*Example 5.*—50 parts by weight of the azo dyestuff from diazotized 1-amino-2-hydroxynaphthalene-4-sulfonic acid and 1-naphthol-8-sulfonic acid are boiled under a reflux condenser with 250 parts by weight of pyridine, 250 parts by weight of water and 20 parts by weight of 50% chromium chloride solution until no further change of color occurs. The solution is then filtered and evaporated, and the chromium compound is salted out. It is a black powder, which dissolves in water with a blue coloration and dyes wool from an acid solution blue shades, fast to fulling and light.

*Example 6.*—30 parts by weight of the azo dyestuff from diazotized 1-amino-2-hydroxynapthalene-4-sulfonic acid and 1-phenyl-2-methyl-5-pyrazolone are heated at about 125–130° C. in an autoclave with 300 parts of water, 30 parts by weight of dimethylamine solution and 10 parts by weight of chromium fluoride until the yellowish red dyestuff has been converted into the bluish red chromium compound. The solution is then filtered and evaporated, and the chromium compound is salted out and dried.

A dark powder is obtained, which dyes wool and silk Bordeaux red. The dyeing is fast to fulling and light.

*Example 7.*—30 parts by weight of the dyestuff from diazotized 1-amino-2-hydroxynaphthalene-4-sulfonic acid 1-p-sulfo-phenyl-3-methyl-5-pyrazolone are heated at about 130° C. in an autoclave with 8 parts by weight of chromium fluoride and 50 parts by weight of hexahydromethylaniline in 300 parts by weight of water with stirring until the shade undergoes no further alteration. The hexahydromethylaniline is then distilled off with steam, the solution is filtered from excess chromium hydroxide, and the chromium compound is salted out. The latter is a dark powder, which dyes wool Bordeaux red. The dyeing is fast to carbonization, fulling and light.

*Example 8.*—The dyestuff from diazotized 2-aminobenzoic acid and 2-naphthol-6-sulfonic acid yields, when treated according to the process of Example 1, a chromium compound, which dyes wool brownish red.

*Example 9.*—40 parts by weight of the azo dyestuff from diazotized anthranilic acid and 1.3-dihydroxyquinoline are heated at about 125° C. in an autoclave with 20 parts by weight of a 50% chromium chloride solution, 50 parts by weight of pyridine and 400 parts of water until the yellow dyestuff has become orange. After working up in the known manner, the chromium compound is obtained as a dark powder, which dyes wool a yellowish orange with satisfactory fastness properties.

*Example 10.*—30 parts by weight of the azo dyestuff from diazotized 2-amino-benzoic acid and 1-phenyl-5-pyrazolone-3-carboxylic acid are heated at 125–130° C. in an autoclave with 18 parts by weight of 50% chromium chloride solution, 70 parts by weight of pyridine and 300 parts by weight of water until the formation of the chromium compound is complete. This is the case when a test portion dyed on wool no longer changes in shade on after-chroming. The chromium compound is a dark powder, it dyes wool and silk a reddish yellow. The dyeing is fast to fulling, carbonization and light.

*Example 11.*—The azo dyestuff from diazotized 2-aminobenzoic acid and 1.2'-chloro-5'-sulfophenyl-3-methyl-5-pyrazolone, when treated according to the process of Example 10, yields a yellow chromium compound, which dyes wool yellow shades fast to carbonization, fulling and light.

*Example 12.*—The chromium compound of the dyestuff from diazotized 5-sulfo-2-aminobenzoic acid and 1-phenyl-3-methyl-5-pyrazolone is obtained in a similar manner to that described in Example 10. The properties are similar to those of the chromium compound obtained in Example 11.

*Example 13.*—By prolonged boiling of the dyestuff from diazotized 4-chloro-aniline-3-sulfonic acid and salicylic acid with a chromium salt in pyridine under a reflux condenser, the chromium compound of this dyestuff is obtained as a yellow powder, which dyes wool yellow shades, fast to fulling.

I claim:

1. In the process of preparing chromium compounds of azo dyestuffs the step which comprises chroming in the presence of an organic base an azo dyestuff containing at least one group inducing solubility in water and being capable of forming metallic complex compounds.

2. In the process of preparing chromium compounds of azo dyestuffs the step which comprises chroming in the presence of pyridine an azo dyestuff containing at least one group inducing solubility in water and being capable of forming metallic complex compounds.

3. In the process of preparing chromium compounds of azo dyestuffs the step which comprises chroming in a 10-20% aqueous pyridine solution an azo dyestuff containing at least one group inducing solubility in water and being capable of forming metallic complex compounds.

In testimony whereof, I affix my signature.

RICHARD STÜSSER.